(12) United States Patent
Iida et al.

(10) Patent No.: US 10,347,005 B2
(45) Date of Patent: Jul. 9, 2019

(54) OBJECT STATE IDENTIFICATION METHOD, OBJECT STATE IDENTIFICATION APPARATUS, AND CARRIER

(71) Applicants: MURATA MACHINERY, LTD., Kyoto-shi, Kyoto (JP); UMEMURA Educational Institutions, Nagoya-shi, Aichi (JP)

(72) Inventors: Masaomi Iida, Kyoto (JP); Manabu Hashimoto, Aichi (JP); Shoichi Takei, Aichi (JP)

(73) Assignees: MURATA MACHINERY, LTD., Kyoto (JP); UMEMURA EDUCATIONAL INSTITUTIONS, Aichi (JP)

( * ) Notice: Subject to any disclaimer, the term of this patent is extended or adjusted under 35 U.S.C. 154(b) by 33 days.

(21) Appl. No.: 15/440,106

(22) Filed: Feb. 23, 2017

(65) Prior Publication Data
US 2017/0243369 A1    Aug. 24, 2017

(30) Foreign Application Priority Data
Feb. 23, 2016    (JP) .................... 2016-032528

(51) Int. Cl.
*G06K 9/46* (2006.01)
*G06T 7/60* (2017.01)
*G06T 7/73* (2017.01)

(52) U.S. Cl.
CPC .............. *G06T 7/73* (2017.01); *G06K 9/4604* (2013.01); *G06T 7/60* (2013.01); *G06T 7/75* (2017.01);
(Continued)

(58) Field of Classification Search
CPC .... G06T 7/73; G06T 7/75; G06T 7/60; G06T 2200/04; G06T 2207/10028; G06K 9/4604
See application file for complete search history.

(56) References Cited

U.S. PATENT DOCUMENTS

| 5,812,395 A | * | 9/1998 | Masciangelo | ........ B25J 9/1697 187/222 |
| 6,421,048 B1 | * | 7/2002 | Shih | ........................ G06F 3/016 345/419 |

(Continued)

FOREIGN PATENT DOCUMENTS

| JP | 09-218014 A | 8/1997 |
| JP | 2015-225453 A | 12/2015 |
| WO | 2010/140613 A1 | 12/2010 |

OTHER PUBLICATIONS

Hashimoto, "Three-dimensional characteristic quantity for distance data handling", Chukyo University, Graduate school, Information science graduate course, Mar. 5, 2015, pp. 1-15.

*Primary Examiner* — Mia M Thomas
(74) *Attorney, Agent, or Firm* — Keating & Bennett, LLP

(57) ABSTRACT

A carrier for carrying an object includes a fork that is vertically movable to carry the object and that is able to be inserted into an opening of a flat portion of the object, a sensor that obtains actual measured values at a plurality of points on the flat portion of the object, and an object state identification device that identifies, based on the actual measured values, an object state including at least one of a position and a posture of the object with respect to the sensor.

9 Claims, 9 Drawing Sheets

(52) U.S. Cl.
CPC ............... *G06T 2200/04* (2013.01); *G06T 2207/10028* (2013.01)

(56) References Cited

U.S. PATENT DOCUMENTS

| | | | | |
|---|---|---|---|---|
| 8,854,433 B1* | 10/2014 | Rafii | ............... | G06F 3/017 348/42 |
| 9,552,673 B2* | 1/2017 | Hilliges | ............... | G06F 3/011 |
| 2004/0000121 A1* | 1/2004 | Ichikawa | ............... | B65B 5/06 53/173 |
| 2004/0252987 A1* | 12/2004 | Kobayashi | ............... | G02B 7/14 396/6 |
| 2007/0280677 A1* | 12/2007 | Drake | ............... | G02B 7/02 396/429 |
| 2012/0126000 A1* | 5/2012 | Kunzig | ............... | G06Q 10/087 235/385 |
| 2012/0146789 A1* | 6/2012 | De Luca | ............... | G08B 21/12 340/540 |
| 2012/0155706 A1* | 6/2012 | Honjo | ............... | G01B 11/2513 382/103 |
| 2013/0101230 A1* | 4/2013 | Holeva | ............... | B66F 9/122 382/202 |
| 2013/0230235 A1* | 9/2013 | Tateno | ............... | G06T 19/003 382/154 |
| 2014/0074341 A1* | 3/2014 | Weiss | ............... | B66F 9/063 701/25 |
| 2015/0016712 A1* | 1/2015 | Rhoads | ............... | G06K 9/00208 382/154 |
| 2015/0181198 A1* | 6/2015 | Baele | ............... | G06T 7/80 348/46 |
| 2015/0301592 A1* | 10/2015 | Miller | ............... | G06F 3/011 345/156 |
| 2015/0302643 A1* | 10/2015 | Miller | ............... | G06F 3/011 345/633 |
| 2015/0302644 A1* | 10/2015 | Miller | ............... | G06F 3/011 345/633 |
| 2015/0347840 A1* | 12/2015 | Iida | ............... | H04N 13/271 382/103 |
| 2016/0026253 A1* | 1/2016 | Bradski | ............... | G02B 27/225 345/8 |
| 2016/0104274 A1* | 4/2016 | Jovanovski | ............... | G05B 19/402 348/46 |
| 2017/0039731 A1* | 2/2017 | Liu | ............... | G06T 7/60 |
| 2017/0199580 A1* | 7/2017 | Hilliges | ............... | G06F 3/011 |
| 2017/0228885 A1* | 8/2017 | Baumgartner | ............... | G06T 7/62 |
| 2017/0243372 A1* | 8/2017 | Iida | ............... | G06T 7/75 |
| 2017/0287212 A1* | 10/2017 | Tran | ............... | B29C 64/386 |
| 2017/0312031 A1* | 11/2017 | Amanatullah | ............... | G09B 23/28 |

* cited by examiner

OBJECT STATE IDENTIFICATION METHOD, OBJECT STATE IDENTIFICATION APPARATUS, AND CARRIER

CROSS REFERENCE TO RELATED APPLICATIONS

This application claims the benefit of priority to Japanese Patent Application No. 2016-032528 filed on Feb. 23, 2016. The entire contents of this application are hereby incorporated herein by reference.

BACKGROUND OF THE INVENTION

1. Field of the Invention

The present invention relates to an object state identification method, an object state identification apparatus, and a carrier including an object state identification apparatus that identify the state of an object, such as the position and posture thereof. In particular, the present invention relates to an object state identification method, an object state identification apparatus, and a carrier, each of which identifies an object state indicating the position, posture, etc., of an object including a flat portion including an opening on a surface of the object when an automated guided carrier or the like holds the object.

2. Description of the Related Art

Various object state identification methods for identifying an object state based on information of an image captured of an object have been proposed.

For example, Japanese Unexamined Patent Application Publication No. H09-218014 discloses a device which generates three-dimensional information including distance information of each point on an object based on two data pieces of images captured by a pair of cameras provided at different positions, and identifies the object state based on the three-dimensional information.

International Publication No. 2010/140613 discloses a device which calculates feature values by creating a histogram from feature points in distance information (three-dimensional information) of each point on an object, obtained from a time-of-flight (TOF) camera, and compares the feature value with a reference pattern to identify the object.

Japanese Unexamined Patent Application Publication No. 2012-123781 discloses an apparatus which calculates three-dimensional coordinates of an object from two-dimensional information and distance information of each point on the object, and matches the three-dimensional coordinates to three-dimensional model data serving as a reference pattern to identify the state of the object.

In conventional devices that identify the state of an object such as those disclosed in Japanese Unexamined Patent Application Publication No. H09-218014, International Publication No. 2010/140613 and Japanese Unexamined Patent Application Publication No. 2012-123781, feature points of the object are extracted from three-dimensional information obtained by capturing an image of the object, and the state of the object is identified based on the feature points.

In the conventional method, there is a trade-off between the speed increase and the accuracy, meaning that it is difficult to achieve both a target speed increase and a target accuracy.

SUMMARY OF THE INVENTION

Preferred embodiments of the present invention provide an object state identification method, an object state identification apparatus, and a carrier, each of which identifies the state of an object quickly and accurately under low calculation load by focusing on an object including a flat portion including an opening on a surface thereof.

An object state identification method according to an aspect of a preferred embodiment of the present invention identifies an object state including at least one of a position and a posture of an object with respect to a sensor by obtaining actual measured values at a plurality of points on a flat portion of the object by the sensor, the actual measured values being three-dimensional data, the flat portion being on a surface of the object and including an opening. The object state identification method includes: extracting a corresponding point value indicating a position of an edge of the opening based on a predetermined feature value; calculating a plane equation indicating a plane including the flat portion based on the corresponding point value to determine a virtual plane; extracting an actual measured value that is in the virtual plane from the actual measured values as a stable point; and identifying the object state of the object based on the stable point.

Furthermore, an object state identification apparatus according to an aspect of a preferred embodiment of the present invention includes: an actual measured value receiver that obtains actual measured values at a plurality of points on a flat portion of an object from a sensor, the actual measured values being three-dimensional data, the flat portion being on a surface of the object and including an opening; a corresponding point extractor that extracts a corresponding point value indicating a position of an edge of the opening based on a predetermined feature value; a virtual plane determination calculator that calculates a plane equation indicating a plane including the flat portion based on the corresponding point value to determine a virtual plane; and an object state identifier that identifies an object state of the object based on a stable point which is an actual measured value that is in the virtual plane among the actual measured values.

Therefore, it is possible to identify the position and posture of the object quickly and accurately.

Furthermore, a carrier according to an aspect of a preferred embodiment of the present invention carries an object with a fork inserted into an opening of a flat portion of the object, the flat portion being on a surface of the object. The carrier includes: a sensor that obtains actual measured values at a plurality of points on the flat portion of the object, the actual measured values being three-dimensional data; and an object state identification apparatus that identifies, based on the actual measured values, an object state including at least one of a position and a posture of the object with respect to the sensor. The object state identification apparatus includes: an actual measured value receiver that obtains the actual measured values, which are the three-dimensional data, at the plurality of points on the flat portion including the opening on the surface of the object from the sensor; a corresponding point extractor that extracts a corresponding point value indicating a position of an edge of the opening based on a predetermined feature value; a virtual plane determination calculator that calculates a plane equation indicating a plane including the flat portion based on the corresponding point value to determine a virtual plane; and an object state identifier that identifies the object state of the object based on a stable point which is an actual measured value that is in the virtual plane among the actual measured values.

Therefore, fast feedback of the position and posture of the object is possible under low calculation load, and thus it is possible to provide a carrier capable of holding the object quickly and smoothly.

According to another preferred embodiment of the present invention, a non-tangible computer readable medium includes stored thereon a program that causes causing a computer to execute an object state identification method according to a preferred embodiment of the present invention.

According to various preferred embodiments of the present invention, it is possible to identify the position, posture, etc., of an object quickly and easily, even along with accuracy, under low calculation load.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
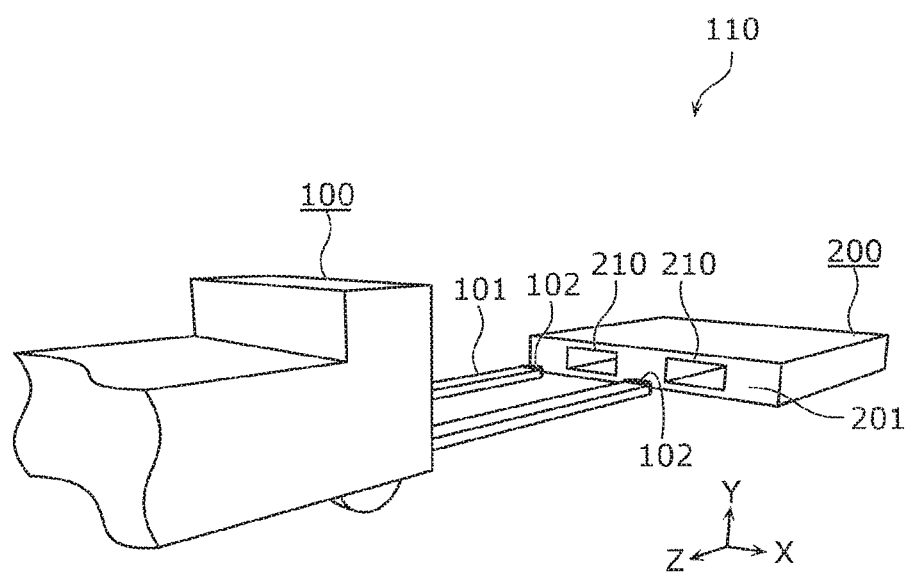
FIG. 1 is a perspective view illustrating an object and a carrier.

Object state identification methods according to preferred embodiments of the present invention will be described with reference to the drawings. Note that the following preferred embodiments are mere examples of the object state identification methods according to the present invention. Therefore, the scope of the present invention is defined by the recitations in the claims, with reference to the following preferred embodiments, and is not limited to only the following preferred embodiments. Thus, among the structural elements in the following preferred embodiments, structural elements not recited in any one of the independent claims which indicate the broadest concepts of the present invention are described as preferred structural elements, and are not absolutely necessary to overcome the problem according to the present invention.

The drawings are schematic illustrations including appropriate emphasis, omission, adjustment in proportion, and so on for the purpose of describing preferred embodiments of the present invention; there are cases where the actual shapes, positional relationship, and proportion are different from those in the drawings.

FIG. 1 is a perspective view illustrating an object and a carrier.

An object 200 includes a flat portion 201 and an opening 210. The type of the object 200 is not particularly limited. Examples of the object 200 include a conveyable article and a static structure difficult to carry.

The flat portion 201 is a portion of a surface of the object 200. The opening 210 is provided in a portion of the flat portion 201.

The opening 210 is an opening end of a hole depressed from the flat portion 201 or a flat portion 201-side opening end of a through-hole extending from the flat portion 201 to an end surface on the other side. The shape of the opening 210 is not particularly limited and may be a rectangle including a square, a circle, an ellipse, or an oval, for example. The number of openings 210 in the flat portion 201 is not particularly limited. For example, in a single flat portion 201, there may be a single opening 210, or there may be two or more openings 210.

In the present preferred embodiment, the object 200 is a pallet defining and functioning as a board on which a load is placed in distribution facilities and the like. The object 200 defining a pallet preferably is square or substantially square board-shaped in plan view. Two openings 210 are arranged in the flat portion 201 which corresponds to one side of the object 200. The openings 210 each correspond to the opening end of a through-hole extending from the flat portion 201 to the opposite end surface. The two openings 210 are preferably horizontally-elongated rectangular and have the same shape. Furthermore, the two openings 210 are arranged so that the flat portion 201 has line symmetry about an axis passing through the center of the flat portion 201 in the width direction (the X axis direction in the figure) and extending in the vertical direction (the Y axis direction in the figure). The openings 210 preferably are sized to allow insertion of a fork 101 of a carrier 100.

The carrier 100 preferably is a wheeled cart that lifts and carries the object 200, which includes the flat portion 201 including the openings 210 on a surface of the object, with the fork 101 inserted into the openings 210 of the object 200. In the present preferred embodiment, the carrier 100 includes two claws which define the fork 101 and each of which includes a sensor 102 at the distal end thereof. The two claws are arranged in parallel or substantially in parallel with each other and are attached to a carrier system 110 so as to be vertically movable while remaining parallel or substantially parallel to the floor surface on which the carrier 100 travels. The carrier 100 is an automated guided vehicle which is able to autonomously run and carry a load without being attended by persons, and includes an object state identification apparatus 103 (see FIG. 2) therein.

The sensor 102 is not particularly limited so long as it is a device that is able to obtain actual measured values which are three-dimensional data at a plurality of points on the flat portion 201 of the object 200 that includes the opening 210. Examples of the sensor 102 include a sensor that includes two cameras and obtains an actual measured value using a parallax between two two-dimensional images, a time-of-flight (TOF) camera which measures the distance to a target for each pixel by measuring, for each imaging pixel, the length of time from when a light-emitting diode (LED) provided around the camera emits infrared light to when the camera observes the light reflected off the target, and a distance sensor that measures the coordinates of a plurality of points and the distances to the plurality of points based on scanned and reflected laser light. In the present preferred embodiment, the sensor 102 is preferably a TOF camera, for example.

Figure 2:
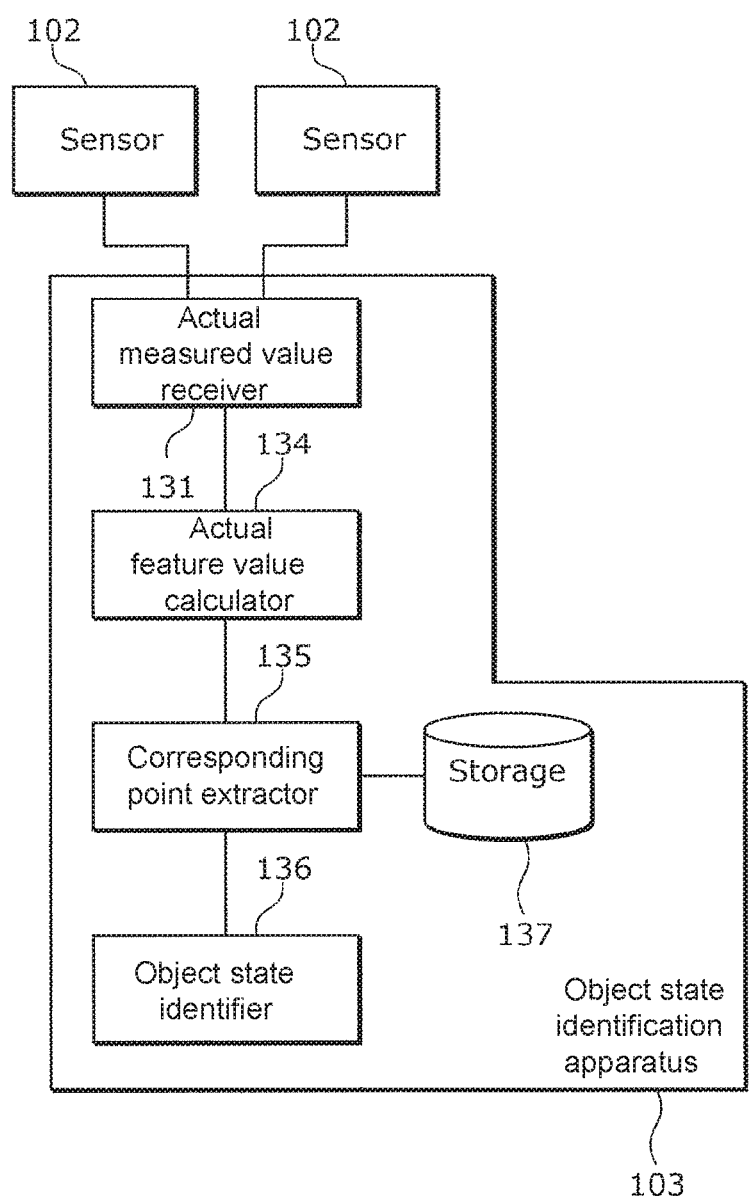
FIG. 2 is a block diagram illustrating a functional configuration of an object state identification apparatus.

FIG. 2 is a block diagram illustrating a functional configuration of the object state identification apparatus.

The object state identification apparatus 103 is a processor or central processing unit (CPU) that is configured or programmed to identify an object state including at least one of the position and the posture of the object 200 with respect to the sensor 102. The object state identification apparatus 103 is configured or programmed to include, as part of the processor or CPU defining the object state identification apparatus 103 or as additional processors included in the object state identification apparatus 103, each of the following: an actual measured value receiver 131, an actual feature value calculator 134, a corresponding point extractor 135, an object state identifier 136, and a storage (memory) 137 that stores a model feature value.

In the storage 137, a model feature value representing the geometric feature of the object 200 is stored. The model feature value is, for example, a feature value obtained based on three-dimensional data of points on surfaces of the object 200, obtained from the sensor 102, when the object 200 is positioned so that the position and posture of the object 200 with respect to the sensor 102 are clearly determined. Specifically, for example, the model feature value is defined as a set of points and a set of line segments connecting the points. The model feature value is, for example, 1) a range of distances between adjacent points among three feature points, 2) a range of distances between points at both ends among the three points, 3) a range of angles between the three feature points, and 4) an average and a variance of each dimension (angle) of a fast point feature histogram (FPFH) of feature points and interpolation points.

The actual measured value receiver 131 is a processor that receives or obtains from the sensors 102 actual measured values indicating the positions of a plurality of points on the flat portion 201 of the object 200 with respect to the sensor 102, and the distance of the plurality of points to the sensor 102, which are measured by the sensor 102.

Figure 3:
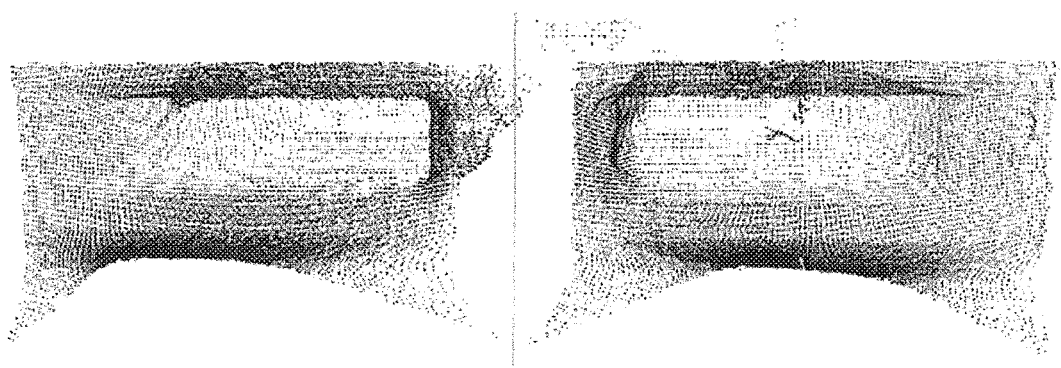
FIG. 3 is a visual illustration of actual measured values obtained by a sensor.

In the present preferred embodiment, the carrier 100 includes the sensors 102, each of which preferably is a TOF camera at the distal end of the fork 101, and each of the sensors 102 measures the flat portion 201 that includes and surrounds one of the openings 210. The actual measured value receiver 131 integrates the actual measured values obtained from the sensors 102 in consideration of the positional relationship between the sensors 102. When the integrated actual measured values are represented as a two-dimensional image, an image such as that illustrated in FIG. 3 is obtained.

The actual feature value calculator 134 is a processor that, based on each actual measured value obtained by the actual measured value receiver 131, calculates an actual feature value by the same method as the method used earlier to calculate the model feature value.

The method of calculating a feature value is not particularly limited. Aside from the above-described method, the feature value may be calculated, for example, using a normal direction histogram generated based on the angle between the normal direction vector of each point and the normal vector of a surrounding feature point. Specifically, fast point feature histograms (FPFH) can be used. Furthermore, since the actual measured value is three-dimensional data, the feature value may be calculated using a distance histogram of each point based on distance data. As another example of the method of calculating a feature value, the feature value may be calculated using a luminance histogram based on the luminance of each pixel.

The corresponding point extractor 135 is a processor that compares the model feature value stored in the storage 137 with the actual feature value calculated by the actual feature value calculator 134, and extracts, as a corresponding point value indicating the position of the flat portion 201, the actual measured value used as the standard for the actual feature value that matches the model feature value.

In the present preferred embodiment, the corresponding point extractor 135 compares, for each actual measured value, the feature value calculated by the actual feature value calculator 134 and the model data stored in the storage 137 with each other. The matching is performed based on the degree of similarity between the model feature value stored in the storage 137 and the actual feature value.

Note that the corresponding point extractor 135 may perform down-sampling on the actual measured value. For example, one or more pairs of actual measured values that have a particular geometric relationship may be extracted from the actual measured values, and if the angle between line segments connecting the points separated each other by a distance in a predetermined range is within a predetermined range, down-sampling in which these three feature points are set as candidate matching points may be performed. The corresponding point extractor 135 may perform down-sampling in which midpoints between a feature point located at the center and other two feature points may be set as candidate points for pattern matching. This down-sampling may be performed in the actual feature value calculator 134.

The object state identifier 136 is a processor that identifies the object state including at least one of the position and the posture of the object with respect to the sensor 102 based on the corresponding point value extracted by the corresponding point extractor 135.

Figure 4:
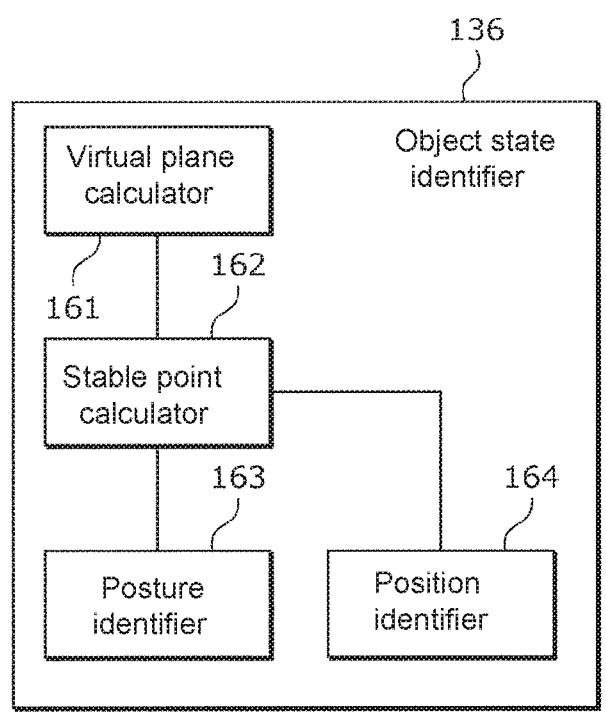
FIG. 4 is a block diagram illustrating a functional configuration of the object state identification apparatus in detail.

FIG. 4 is a block diagram illustrating the object state identifier 136 in detail.

As illustrated in FIG. 4, the object state identifier 136 includes a virtual plane determination calculator 161, a stable point calculator 162, a posture identifier 163, and a position identifier 164.

The virtual plane determination calculator 161 is a processor that calculates a plane equation representing a plane including the flat portion 201 based on the corresponding point value extracted by the corresponding point extractor 135. The method of calculating a plane equation is not particularly limited, but in the present preferred embodiment, the corresponding points extracted by the corresponding point extractor 135 are considered to include noise, and therefore a method of estimating a parameter in a plane equation with outliers removed (for example, random sample consensus (RANSAC) or the like) is preferably used.

The stable point calculator 162 is a processor that extracts, as a stable point, an actual measured value that is in a virtual plane calculated by the virtual plane determination calculator 161.

The actual measured value that is in the virtual plane herein means not only the actual measured value that satisfies the plane equation calculated by the virtual plane determination calculator 161, but also an actual measured value that satisfies the plane equation within a range of error.

The posture identifier 163 is a processor that identifies the posture of the object 200 based on a stable point. The posture preferably is the orientation of the object 200 with respect to the sensor 102. Specifically, for example, the posture is a three-dimensional angle between a representative axis indicating the orientation of the object 200 and a measurement axis connecting the sensor 102 and the center of the measurement region covered by the sensor 102. In the present preferred embodiment, since the object 200 which is a pallet and the carrier 100 are arranged in the same plane (on the same floor surface), the posture of the object 200 is an angle between a straight-ahead direction of the carrier 100 and a representative axis which is an axis of the through-hole that defines the opening 210.

The method used by the posture identifier 163 to identify a posture is not particularly limited. For example, the normal to the virtual plane determined by the virtual plane determination calculator 161 may be set as a representative axis indicating the orientation of the object 200, to identify the posture of the object 200 in accordance with the straight-ahead direction of the carrier 100 obtained from the carrier 100 or the like.

In the present preferred embodiment, stable points are projected on a surface that intersects with the virtual plane and corresponds to the floor surface on which the object 200 and the carrier 100 are arranged, a front point group that is one or more points located in a front area is extracted from the obtained projected point group, and the posture of the object 200 is identified based on this front point group. The method of identifying the posture of the object 200 based on the front point group is not particularly limited. In the present preferred embodiment, the front points are considered to include noise, and therefore, a method of estimating a parameter in a straight-line equation with outliers removed (for example, random sample consensus (RANSAC) or the like) is preferably used, as in the case where the plane equation is created. This makes it possible to accurately identify the posture of the object 200.

Figure 5:
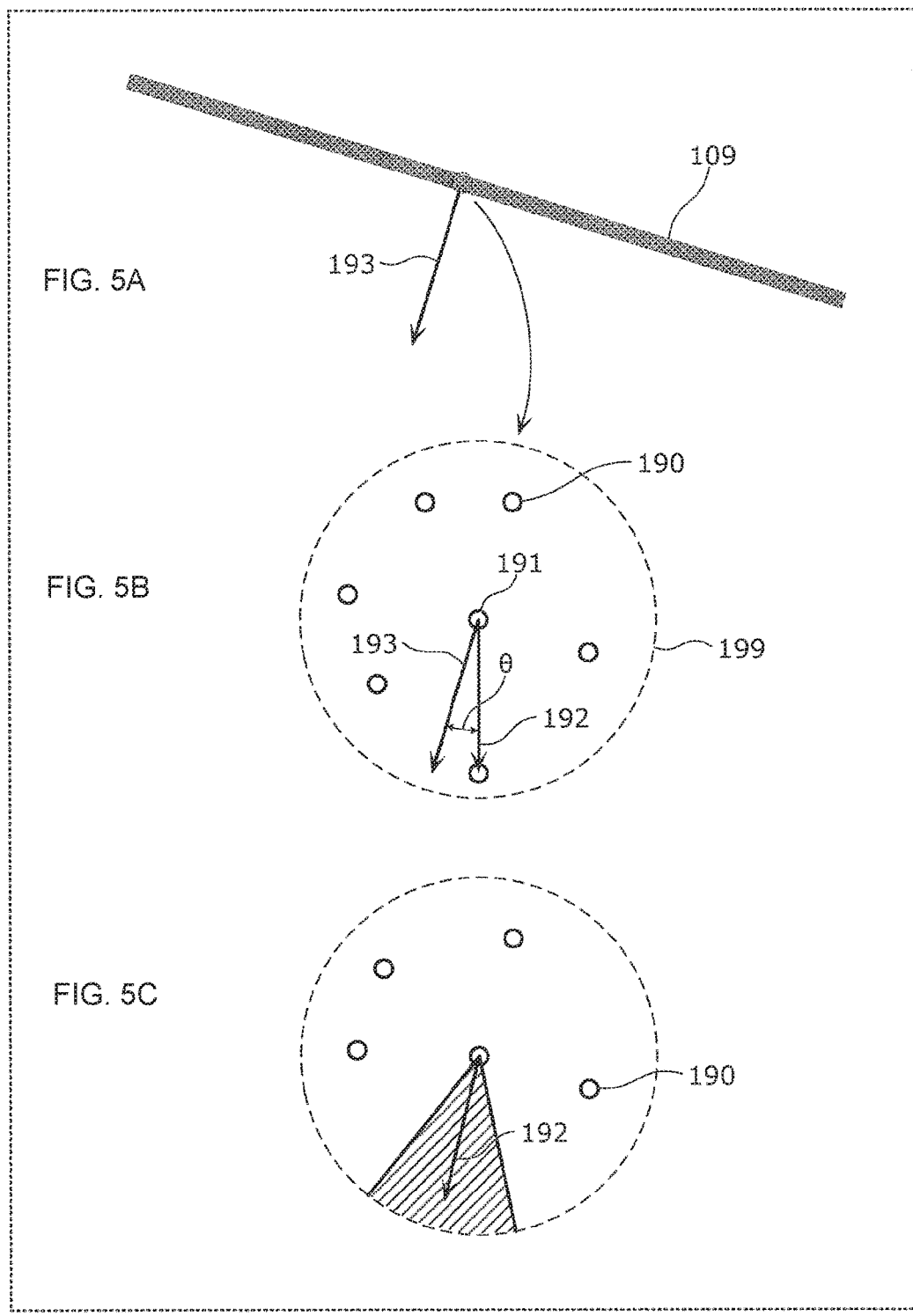
FIGS. 5A-5C are visual illustrations of processing operations of a posture identifier.

The front point is identified as follows. As illustrated in FIG. 5A, a projected point group 109 is a linear collection of projected points. In FIG. 5A, the projected points are aligned in the shape of a rectangular band, for example. In reality, the projected points are arranged at random while maintaining the shape of a band. Next, as illustrated in FIG. 5B, one point among projected points 190 is defined as an interest point 191, and a projected point 190 included in a region 199 (in the shape of a circle in the present preferred embodiment) including the interest point 191 is extracted. An angle θ is calculated which is an angle between an interest point vector 192 which is a vector from the interest point 191 to each of the extracted, projected points 190 and a normal vector 193 which is normal to the virtual plane determined by the virtual plane determination calculator 161. In the case where the angle θ is not included in a predetermined angle range (indicated by the diagonal lines in FIG. 5C), that is, in the case where there are no other projected points 190 within the predetermined angle range centered on the interest point vector 192, the interest point 191 is identified as the front point. In this way, each of two or more different projected points is defined as the interest point 191 to identify a front point, and the front point group is thus extracted.

The position identifier 164 identifies a center position of the opening 210 based on the stable points calculated by the stable point calculator 162, and identifies the position of the center of the opening 210 as the position of the object 200.

The method of identifying the center position of the opening 210 is not particularly limited; examples of the method include the following non-limiting exemplary methods.

Example 1 of Position Identification Method

Figure 6:
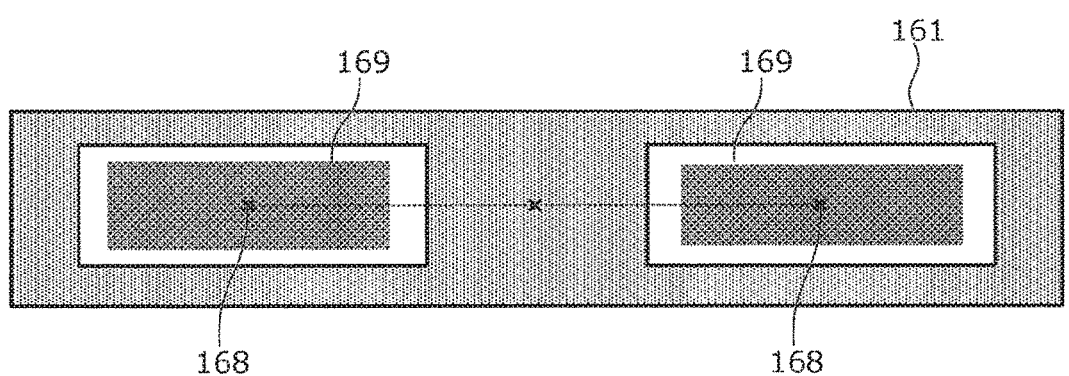
FIG. 6 is a visual illustration of processing operations to determine the center of an opening from a virtual plane.

First, temporary points are generated at random in the virtual plane determined by the virtual plane determination calculator 161. Next, the temporary points that are located near the stable points are removed. As a result of the removal, a remaining point group 169 preferably has a shape as illustrated in FIG. 6. Next, the centroid (the center) of the remaining point group that is made up of the remaining temporary points is calculated. The position of the calculated centroid (the calculated center) is a center position 168 of the opening 210.

In the present preferred embodiment, the object 200, which is a pallet, preferably includes two openings 210 in the flat portion 201. The two openings 210 are arranged in a plane parallel or substantially parallel to the plane (the floor surface) on which the object 200 is placed. Therefore, the position identifier 164 calculates center positions of the two respective openings 210 and identifies, as the position of the object 200, the midpoint of the line segment connecting these two center positions.

Note that when the center positions of the two respective openings 210 are calculated, the stable points may be clustered into two classes beforehand so that the center position of each of the openings 210 is calculated based on the stable points that belong to a corresponding one of the two classes.

Example 2 of Position Identification Method

In the present preferred embodiment, the object 200, which is a pallet, preferably includes two openings 210 in the flat portion 201. The two openings 210 are arranged in a plane parallel or substantially parallel to the plane (the floor surface) on which the object 200 is placed, and have the same shape. Under the above premise, the position of the object 200 is identified based on the axis of line symmetry of the arrangement of the stable points.

Figure 7:
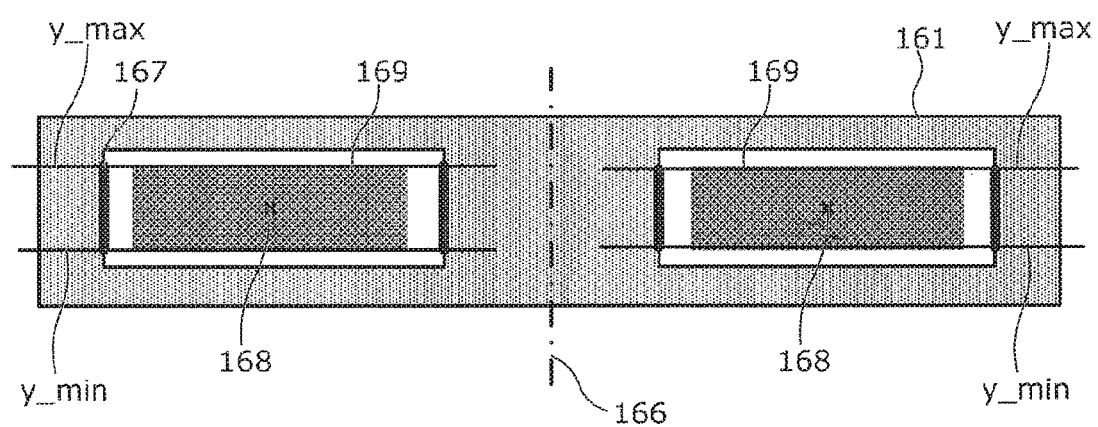
FIG. 7 is a visual illustration of processing operations to determine the position of an object from a virtual plane.

First, temporary points are generated at random in the virtual plane determined by the virtual plane determination calculator 161. Next, the temporary points that are located near the stable points are removed. As a result of the removal, a remaining point group 169 is of a shape such as that illustrated in FIG. 7. The remaining point group is made up of the remaining temporary points. The maximum value y_max and the minimum value y_min of the remaining temporary points in the vertical direction (the Y-axis direction) are calculated from the remaining point group. The innermost stable point is then extracted from the stable points included in the range from the maximum value y_max to the minimum value y_min, and a linear edge component 167 is extracted. Next, a fold line 166 is searched for and determined, across which the positioning error of the edge components 167 is smallest if the virtual plane is folded along the axis extending in the vertical direction and passing through the midpoint of the line segment connecting the previously calculated center positions, for example, the centers of the two respective openings 210. The fold line 166 determined in this way is regarded as the position of the object 200.

Note that when the edge components 167 of the two respective openings 210 are calculated, the stable points may be clustered into two classes beforehand so that each of the edge components 167 may be calculated based on the stable points that belong to a corresponding one of the two classes.

The following will describe the operation to the point when the carrier 100 in the carrier system 110 holds the object 200.

Figure 8:
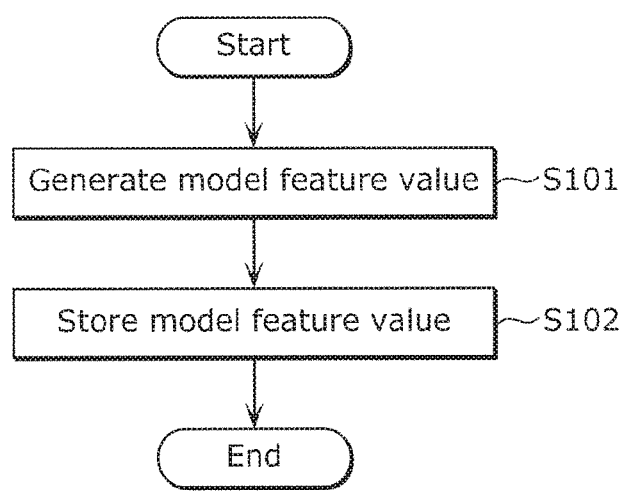
FIG. 8 is a flowchart showing the flow of processes on a model feature value in a preparatory stage.

FIG. 8 is a flowchart showing the flow of processes on a model feature value in a preparatory stage.

First, as a preparation, the model feature value is calculated (S101). The above-described technique can be used to calculate the model feature value. Next, the generated model feature value is stored in the storage 137 of the carrier 100 (S102).

Figure 9:
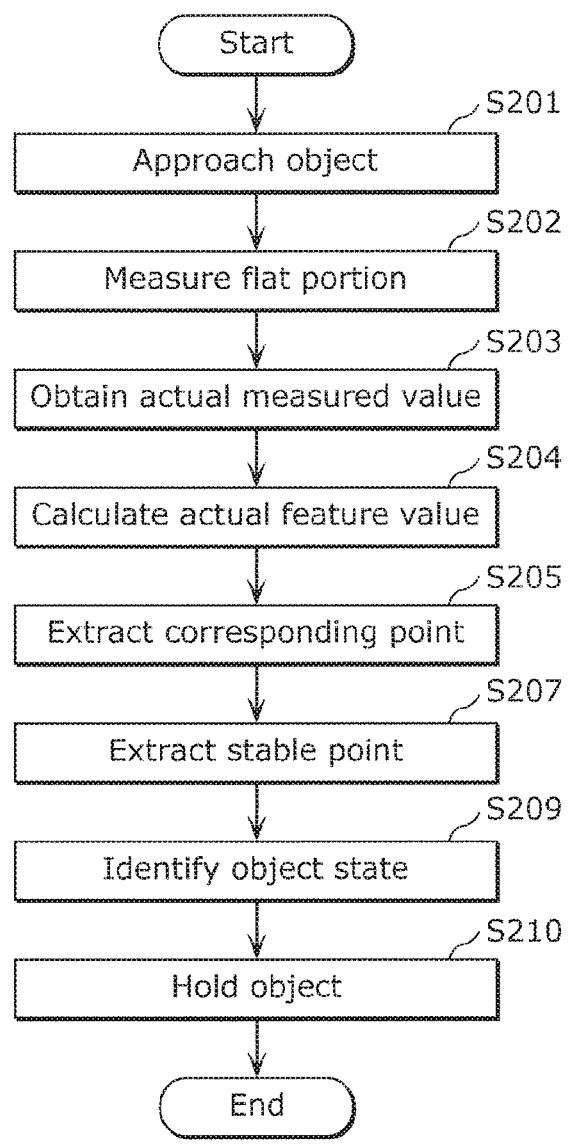
FIG. 9 is a flowchart showing the flow to the point when the carrier holds the object.

FIG. 9 is a flowchart showing the flow to the point when the carrier holds the object.

The pallet that is the object 200 is placed, for example, at a storage and retrieval station in an automated warehouse. The carrier 100 receives a command to carry the object 200 present at the station and then, by referring to a map or the like stored therein, approaches the station at which the object 200 is placed with the fork 101 directed toward the object 200 (S201).

Next, the sensor 102 attached to the distal end of the fork 101 is operated, and the positions of a plurality of points on the flat portion 201 of the object 200 and the distances to the plurality of points are three-dimensionally measured (S202).

The actual measured value receiver 131 obtains or receives an actual measured value as data from the sensor 102 (S203).

When the actual measured value is obtained, the actual feature value calculator 134 calculates an actual feature value for each actual measured value (S204). Note that in the case where processing takes time because there are many actual measured values, the actual feature value may be calculated after down-sampling is performed using the above-described methods, for example.

Next, the calculated actual feature value is matched to the model feature value stored in the storage 137, and the actual measured value used as the standard for the actual feature value indicating the degree of similarity in a predetermined range is extracted as a corresponding point value (S205).

Next, the object state identifier 136 determines a virtual plane and calculates a stable point (S207).

Next, the object state identifier 136 identifies an object state based on the stable point (S209).

At the end, the carrier 100 performs a feedback control on the steering wheel, the driving wheel, or the like according to the obtained object state, and at the stage where the axis of the through-hole including the opening 210 at an end and the axis of the fork 101 coincide with each other, inserts the fork 101 into the opening 210 to lift and hold the object 200 (S210).

According to a preferred embodiment of the present invention, as a result of focusing on the opening 210 and the flat portion 201, the matching is performed using the feature values to extract a corresponding point, and a stable point is extracted according to the plane equation, making it possible to identify the position, posture, etc., of the object 200 accurately based on a large number of stable points.

Furthermore, based on the bilaterally symmetrical arrangement of the openings, the state of the object 200 is able to be recognized quickly and accurately.

Note that the present invention is not limited to the above preferred embodiments. For example, another preferred embodiment realized by arbitrarily combining structural elements or excluding some structural elements described herein may be included as a preferred embodiment of the present invention. Furthermore, variations obtained by various modifications to the foregoing preferred embodiments that can be conceived by a person having ordinary skill in the art, that are within the scope of the essence of the present invention, that is, the intended teachings of the recitations in the claims, are also included in the present invention.

For example, the actual measured value may be obtained by analyzing a plurality of images, and in this case, in the matching for extracting a corresponding point, a predetermined number of feature points that meet a predetermined geometric condition may be extracted as candidate matching points.

Furthermore, in the detection of an image feature point, the Harris algorithm or the scale-invariant feature transform (SIFT) algorithm may be used to detect a feature point. Otherwise, the intrinsic shape signatures (ISS) may be used.

As the method of detecting a feature point, it is sufficient that a significant change in color, luminance, or the like among the pixels of an image be detected, and known techniques can be used aside from the method using the Harris operator or the SIFT operator.

Furthermore, a virtual model may be arbitrarily generated as the model.

Moreover, the shape of the opening 210 is not limited to a rectangle and may be a polygon, a circle, an ellipse, or an oval, or other suitable shape, for example. In the case where the opening 210 is circular in shape, the corner model preferably includes a fan-shaped surface and a circumferential surface intersecting with the fan-shaped surface, but the corner model may be generated assuming that the circumferential surface is a combined surface made up of flat surfaces.

Although only some exemplary preferred embodiments of the present invention have been described in detail above, those skilled in the art will readily appreciate that many modifications are possible in the exemplary preferred embodiments without materially departing from the novel teachings and advantages of the present invention. Accordingly, all such modifications are intended to be included within the scope of the present invention.

Preferred embodiments of the present invention can be applied to an identification apparatus that identifies the position and posture of the object, and is applicable, for example, to an automated guided vehicle, an object state identification apparatus that is mounted on a carrier, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for carrying an object and identifying an object state including at least one of a position and a posture of the object, the method comprising:
    inserting a fork of a carrier into an opening of a flat portion of the object, the fork being vertically movable to carry the object and the flat portion being on a surface of the object;
    sensing, by a sensor, actual measured values at a plurality of points on a flat portion of the object by the sensor, the actual measured values being three-dimensional data,
    extracting a corresponding point value indicating a position of an edge of the opening based on a predetermined feature value;
    calculating a plane equation indicating a plane including the flat portion based on the corresponding point value to determine a virtual plane;

extracting an actual measured value that is in the virtual plane from the actual measured values as a stable point; and identifying the object state of the object based on the stable point.

2. The method for carrying an object and identifying an object state according to claim 1, wherein the stable point is projected on a surface intersecting with the virtual plane, and the posture of the object is identified based on a projected point group obtained by projecting the stable point.

3. The method for carrying an object and identifying an object state according to claim 1, wherein the stable point is projected on a surface intersecting with the virtual plane, and a front point group that includes one or more points located in a front area is extracted from a projected point group obtained by projecting the stable point; and the posture of the object is identified based on the front point group.

4. The method for carrying an object and identifying an object state according to claim 1, wherein a center position of the opening is identified based on the stable point.

5. The method for carrying an object and identifying an object state according to claim 1, wherein the opening includes at least two openings in the flat portion; and the stable point includes at least two openings of two classes, and a center position of each of the at least two openings is identified based on one of the at least two stable points that belongs to a corresponding one of the two classes.

6. The method for carrying an object and identifying an object state according to claim 1, wherein the opening includes at least two openings in the flat portion;

a center position of each of the at least two openings is identified based on the stable point; and the position of the object is identified based on a midpoint between the center position of one of the at least two openings identified and the center position of another of the at least two openings identified.

7. The method for carrying an object and identifying an object state according to claim 1, wherein the opening includes at least two openings in the flat portion; and the position of the object is identified based on an axis of a line symmetry of an arrangement of stable points, each of which is the stable point.

8. The method for carrying an object and identifying an object state according to claim 7, wherein the at least two openings are rectangular or substantially rectangular; and edges of the at least two openings are extracted from the stable points, and the position of the object is identified based on an axis of a line symmetry of an arrangement of the edges extracted.

9. A carrier for carrying an object, the carrier comprising:

a fork that is vertically movable to carry the object and that is able to be inserted into an opening of a flat portion of the object, the flat portion being on a surface of the object;

a sensor that obtains actual measured values at a plurality of points on the flat portion of the object, the actual measured values being three-dimensional data; and an object state identification device that identifies, based on the actual measured values, an object state including at least one of a position and a posture of the object with respect to the sensor, wherein the object state identification device includes a processor and a recording medium associated with the processor, and the processor executes a program stored on the recording medium to implement:

an actual measured value obtainment unit configured to obtain the actual measured values, which are the three-dimensional data, at the plurality of points on the flat portion having the opening on the surface of the object from the sensor;

a corresponding point extraction unit configured to extract a corresponding point value indicating a position of an edge of the opening based on a predetermined feature value;

a virtual plane determination unit configured to calculate a plane equation indicating a plane including the flat portion based on the corresponding point value, and determine a virtual plane; and an object state identification unit configured to identify the object state of the object based on a stable point which is an actual measured value that is in the virtual plane among the actual measured values.

* * * * *